Aug. 18, 1970    J. KLINK    3,524,261
WORK SUPPORTING TABLE FOR COAXIAL COMPARATORS
Filed Aug. 19, 1968    3 Sheets-Sheet 1
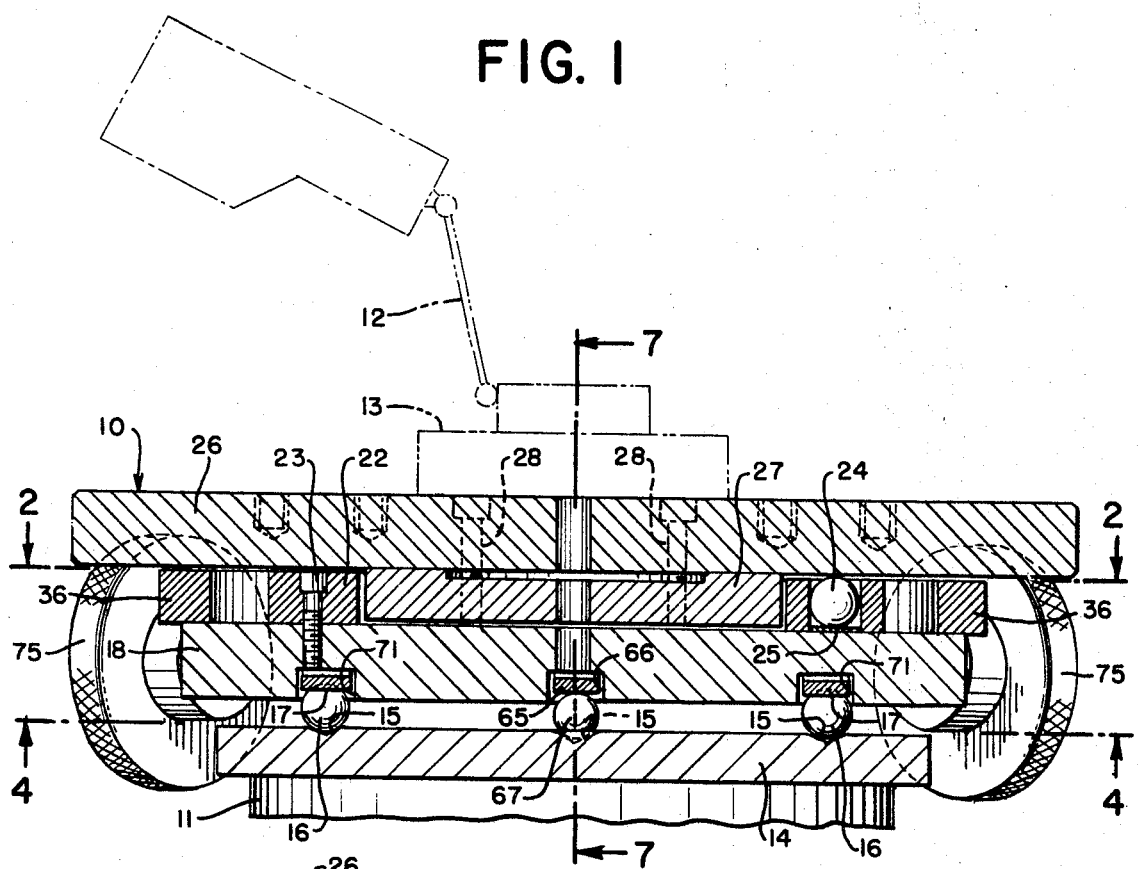
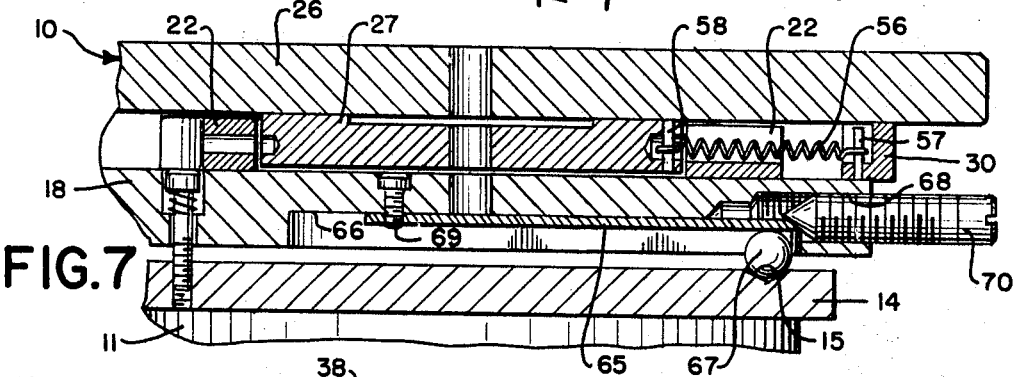
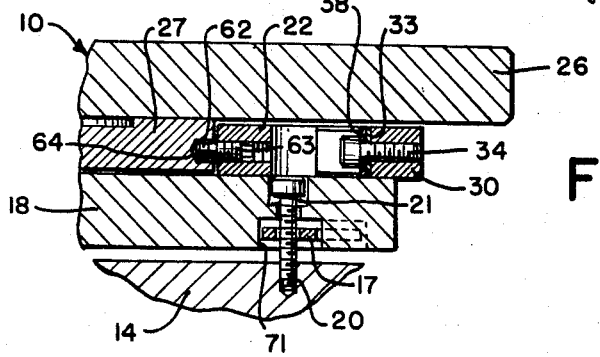
INVENTOR
JOHN KLINK
BY *Gady & Gady*
ATTORNEYS Aug. 18, 1970 J. KLINK 3,524,261
WORK SUPPORTING TABLE FOR COAXIAL COMPARATORS
Filed Aug. 19, 1968 3 Sheets-Sheet 2

INVENTOR
JOHN KLINK

BY *Daly & Daly*

ATTORNEYS

Aug. 18, 1970 J. KLINK 3,524,261

WORK SUPPORTING TABLE FOR COAXIAL COMPARATORS

Filed Aug. 19, 1968 3 Sheets-Sheet 3

INVENTOR
JOHN KLINK

BY *Dodge Daily*

ATTORNEYS

United States Patent Office 3,524,261
Patented Aug. 18, 1970

3,524,261
WORK SUPPORTING TABLE FOR COAXIAL COMPARATORS
John Klink, Pine Plains, N.Y., assignor to Standard Gage Company, Inc., Poughkeepsie, N.Y., a corporation of New York
Filed Aug. 19, 1968, Ser. No. 753,692
Int. Cl. G01b 5/20
U.S. Cl. 33—174                     8 Claims

ABSTRACT OF THE DISCLOSURE

The disclosure herein sets forth a horizontal rotary work-supporting table which is adapted to support a workpiece so that by use of a gaging probe, the roundness, concentricity, and the like of the surfaces of the workpiece may be determined. The work-supporting table is mounted on a rotatable spindle preferably provided with an air bearing, and is provided with adjustments to permit movement of the table to assure that the axes of the workpiece and of the spindle are in alignment, i.e., adjustments are provided on X and Y axes in a plane perpendicular to the spindle axis; and also is provided with means to slightly tilt the table to assure that the axis of the workpiece is parallel to the spindle axis and therefore perpendicular to the surface on which the gaging probe support rests.

---

It is frequently desirable to check machined parts for variation from the true geometrical form desired and to perform such checking with extreme accuracy. In order to accomplish this, it is essential, particularly when a single gaging point or probe supported in fixed position relative to the workpiece is used that the workpiece be accurately centered on the rotary gaging table and that the gaging table be tiltable to assure that the workpiece axis is parallel to the spindle axis. Thus the centering and tilting adjustments together make it possible to position a workpiece so that its axis is parallel to and a prolongation of the spindle axis.

The present invention consists of precise means for moving the work-supporting surface along axes at right angles to each other in a plane perpendicular to the spindle axis to thereby move a workpiece mounted on that table and position the lower end of the axis of the workpiece above the axis of the spindle. Additionally, adjustment means are provided for precisely tilting the work-supporting table to position so that the workpiece axis is parallel to the spindle axis.

As can readily be seen, it is essential that the workpiece axis be precisely concentric to and aligned with the spindle axis, since when roundness or concentricity of two surfaces is to be determined within tolerances of for example a few millionths of an inch, any eccentricity of the workpiece will result in an indication of out-of-roundness, when in fact the workpiece is round. My invention provides means consisting of reeds which are fixed at one end and adjustable at the opposite ends, the reeds being relatively long and the pitch of the screws which adjust the position of the far ends being very fine. The adjustment is effected by moving a pin bearing against the reed adjacent its point of flexure against the table to move the table, for example, along the X axis. Another reed may be provided and arranged in the same manner to move the table along the Y axis. A spring is provided to move the pins into engagement with the reeds, the spring preferably operating along a line midway between the X and Y axes.

A generally similar arrangement of reeds is also utilized for tipping the gaging table or workpiece support so that the workpiece axis may be positioned precisely parallel to the spindle axis, thus eliminating error in reading resulting from the fact that the end of the workpiece is not precisely perpendicular to its axis. It will be understood that although dual gaging points may be utilized, and when so utilized eliminate to a certain extent the necessity for precise adjustment as respects both eccentricity of axis and lack of parallelism of the workpiece and spindle axes, this condition exists in only a small portion of gaging work which is performed to the precision considered, i.e., to precision of 0.00001 inch. Most frequently a single gaging probe is utilized and the necessity for the precise adjustments hereinabove discussed is present.

Certain objects and features of the invention have been indicated in the above discussion. Others will become apparent when the following description is considered in connection with the annexed drawings, in which:

FIG. 1 is a vertical cross-sectional view of the rotary work-supporting table of the invention taken on the line 1—1 of FIG. 2, the view indicating a piece to be gaged on the table and a gaging probe in contact with a surface of revolution of the piece;

Figure 2:
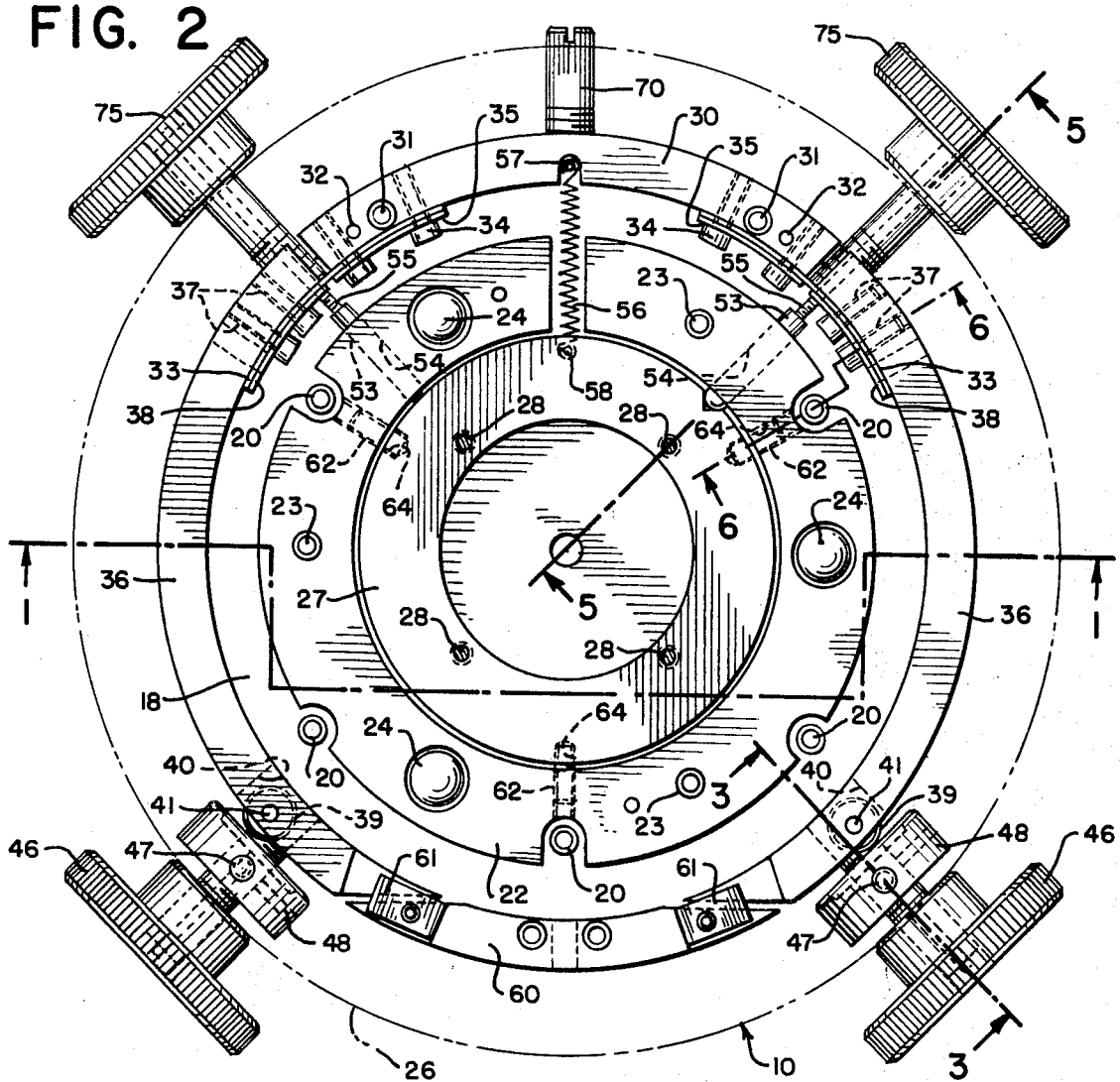
FIG. 2 is a horizontal cross-sectional view through the gaging table, showing particularly the means by which the table and spindle axes are aligned. This view is taken on the plane of the line 2—2 of FIG. 1.

FIG. 6 is a fragmentary vertical cross-sectional view showing means for retaining the rotary table on the air bearing spindle and for retaining the table top with respect to the intermediate tilting mechanism, the view being taken on the plane of line 6—6 of FIG. 2, and FIG. 7 is a vertical cross-sectional view taken on the plane of the lines 7—7 of FIG. 1, showing further detail of the tilting mechanism as well as of the axis alignment mechanism.

Referring now to the drawings, and particularly to FIG. 1, it will be seen that the workpiece supporting table generally designated 10 is supported through intermediate means on a spindle 11 which is an ultraprecision spindle mounted in an air bearing and which permits slow rotation while a gaging probe such as is indicated at 12 is in contact with a workpiece 13.

Fixed to the upper end of the spindle 11 is a disc 14 which is flat and horizontal, and which constitutes a support for the entire gaging table structure 10. Disc 14 is provided with three conical seats 15 approximately 120° apart. Balls resting in these seats engage appropriate depressions in two of the reeds (those designated 17 in FIG. 1) on the underside of table 10, being held in place by the weight of said table; thus the balls serve to fix the angular position of table 10 relative to disc 14. The depression in one of the reeds 17 is conical; the depression in the other reed 17 is elongated to allow for alteration in center distance resulting from deflection of the reeds as adjustments are made. The third reed requires no depression since location is established by the other two.

Each reed is fixed at one end to a disc 18, the balls, reeds and discs constituting a tilting devices for the table 10, which will be described hereinafter. The disc 18 is retained in positon with respect to the disc 14 by means of retaining screws particularly shown in FIG. 6. This retaining means is purely to prevent accidental removal of the table parts and does not constitute in any sense a part of the driving or adjusting means.

Referring now to FIG. 6, it will be seen that screws 20 extend through clearance openings in the disc 18 and are threaded into the underlying disc 14 passing also through clearance openings in the corresponding reeds 17. Each screw has, extending about its shank between a shouldered opening in disc 18 and its head, a compression spring 21, this screw being so adjusted that the amount of compression of the spring which would be brought about for example by tipping the structure during shipping and the like is insufficient to permit escape of the balls 16 from the depressions in the disc 14 and the dimples in the reeds 17.

Fixed to the upper surface of the disc 18 is a ring 22. As seen in FIGS. 1 and 2, the ring 22 is fixed to the disc 18 by means of three cap screws 23 which pass through clearance holes in the ring 22 and are threaded into corresponding tapped holes in the underlying disc 18.

Loosely mounted in cylindrical holes or pockets in the ring 22 are three balls 24 (see FIGS. 1 and 2), the balls seating on shim discs 25 placed in the bottoms of the pockets. These balls 24 support the table proper 26, which table has fixed to its undersurface centrally thereof a disc 27 by means of the screws 28 which pass through the table top 26 and are threaded into disc 27. Disc 27 is of substantially the same thickness as the rim 22 and is thus supported by the balls 24 above the central portion of the disc 18.

The outer diameter of the disc 27 is somewhat less than the inner diameter of the ring 22 and means are provided for shifting the position of the table top 26 along lines at right angles to each other to provide for aligning the axis of the table 26 with the axis of the spindle 11.

Figure 3:
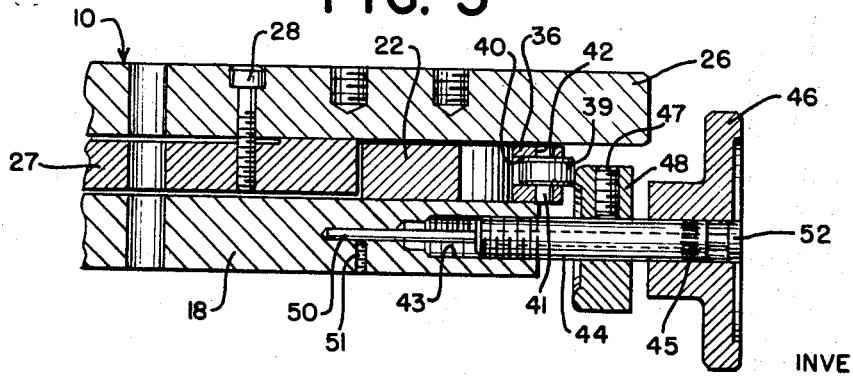
FIG. 3 is a fragmentary vertical cross-sectional view taken on the plane of the line 3—3 of FIG. 2, showing details of the axis alignment means.

The concentricity adjusting means just above-mentioned will now be described. An annular segment 30 (FIG. 2) is fixed by suitable means such as the screws 31 and dowels 32 to the upper surface of the disc 18. Fixed to the surface of the annular segment 30 at each end thereof is a reed 33, the mounting of the reed being effected by means of the screws 34 and washer plate 35. Fixed to each of the reeds 33 is a lever 36, the mounting again being by means of suitable screws 37 and washer plates 38, and the levers 36 being in the form of circle arcs matching the arc of the supporting segment 30. Near the forward end of each lever 36 as seen particularly in FIGS. 2 and 3, there is mounted a roller 39, which roller extends into a horizontal slot 40 in the lever 36 and is mounted on a shaft 41, which is in turn supported in aligned holes 42 in each lever 36.

Threadedly mounted in bores 43 in the disc 18 are adjusting screws 44, each provided with a straight knurled end 45 on which a correspondily internally knurled knob 46 is fixed. Fixed to an unthreaded portion of screw 44 by means of a set screw 47 is a roller or cam 48, the inner surface of which bears against the roller 39. Extending through a bore in each screw 44 is a pin 50, which pin extends into a corresponding bore in disc 18 and is held in position by means of a set screw 51. At its outer end there is fixed to pin 50 a small disc 52, which is of a size to fit in the internal opening in knob 46, the parts being so arranged that when the lever 36 is at the midpoint of its range of adjustment, the outer face of disc 52 is substantially flush with the face of knob 46, the disc 52 thus serving to indicate the position of the knob 46 and consequently the position of the lever 36.

Figure 5:
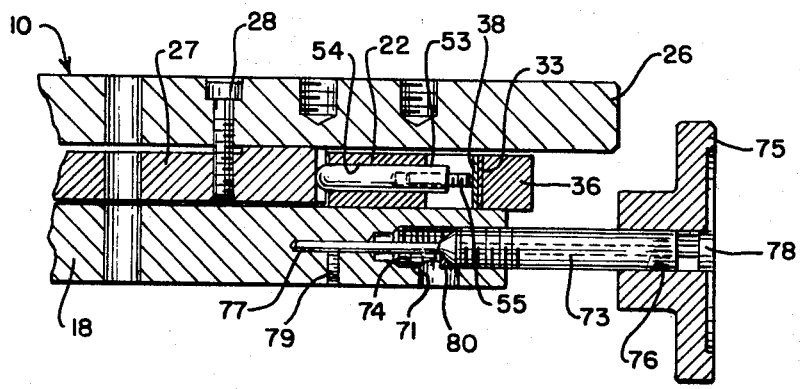
FIG. 5 is a fragmentary cross-sectional view taken on the plane of the line 5—5 of FIG. 2, showing the mode by which the aligning mechanism operates on the table proper, and showing also screw adjusting means for tipping the table with respect to the spindle axis.

Referring now to FIGS. 2 and 5 are especially to FIG. 5, it will be seen that for each lever 36 there is a plunger 53 which is mounted in a bore 54 in ring 22, one of the plungers being provided with an inner spherical end which extends into an axial V-groove in the periphery of the disc 27. The other plunger has a flat end and engages the periphery of disc 27. At their outer ends the plungers 53 have threadedly mounted therein, screws 55 which bear against corresponding washers 38. Thus operation of either of the knobs 46 is effective to move the disc 27 to adjust the center point thereof and of the workpiece supporting table 26 along one of two lines at right angles to each other, to thereby effect precise alignment of the center of a piece on the supporting table 26 with the center of the disc 14 and spindle 11.

As clearly seen in FIG. 2, the disc 27 is urged against the plungers 53 by the tension spring 56 which extends between a pin 57 in the reed support 30 and a similar pin 58 in the disc 27.

In order to guide the outer ends of levers 36, a fixed annular piece 60 is fixed to the disc 18 as is seen in FIG. 2. This piece is beveled at its ends, matching the bevel of levers 36, and guide plates 61 are fixed thereto to guide the levers while permitting their movement.

Referring now to FIG. 6, it will be seen that the disc 27 and table 26 are retained in position during shipment and the like by means of screws 62 threaded in apertures 63 in the ring 22 and extending into clearance bores 64 in the disc 27. It will be noted that the screws 62 serve no purpose in maintaining the rotary position of the disc 27 and table 26 relative to the spindle and that this is accomplished solely by cooperation of the plungers 53 with the disc 27.

Referring now to FIGS. 1, 4, 5, and 7, the mode of tilting the table top to assure that the workpiece axis is truly parallel to the spindle axis and thus perpendicular to the table on which the gaging probe rests, is shown.

Figure 4:
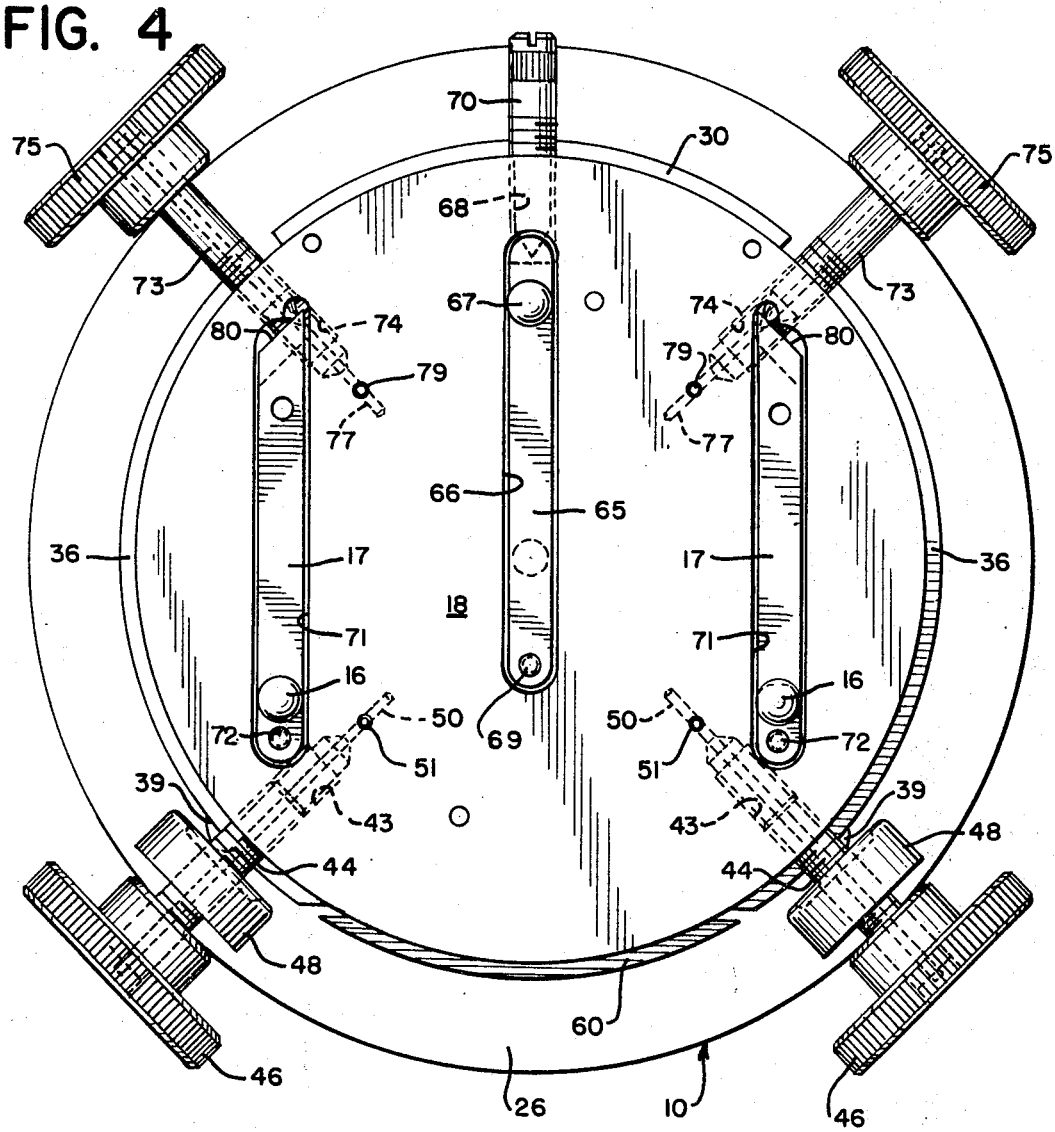
FIG. 4 is a bottom plan view of the gaging table, showing particularly the means for tilting that table relative to the spindle axis. This view is taken on the plane of the line 4—4 of FIG. 1.

Coarse titling adjustment is provided by means of a reed 65, the reed being mounted, as seen in FIG. 4, in a groove 66 in the undersurface of the disc 18 (see also FIG. 7), and being fixed to the disc 18 at its inner end by screw 69. The outer end of the reed 65 rests on a ball 67 which in turn rests on the disc 14. Threaded into a bore 68 (FIG. 7) in the side of disc 18 is a screw 70 having a pointed inner end which bears against the upper end of the reed. It will thus be seen that as the screw is adjusted inwardly in its bore, the reed is flexed and a coarse adjustment of the tipping of the table along a diameter thereof is effected, the upper end being raised with respect to the lower end as seen in FIG. 4.

When the adjusting screw is turned inwardly sidewise tipping of the table is effected by adjustment of the reeds 17 previously mentioned, which reeds are positioned in grooves 71 extending parallel to the groove 66 at either side thereof, as seen in FIG. 4, the reeds being held in position at one end by suitable screws 72. At the opposite ends of the reeds 17, screw means similar to those described in connection with the adjustment of the table axis are provided. These screw means comprise screws 73 (FIG. 5) threaded at their inner ends into bores 74 in the ring 18, and having adjustment knobs 75 fixed thereon by means of straight knurled portions 76 on the screws 73 mating with like knurled interior surfaces of the central bore in knobs 75. Extending through each screw 73 is a rod 77 having a head 78 which in the midposition of adjustment of the corresponding screw 73 has its outer face flush with the outer face of the knob, the rod 77 being held in position by means of a set screw 79. Screw 73 has a pointed inner end, which end overlies the upper sloped end 80 (see FIG. 4) of the corresponding reed 17. Thus as the adjusting screws 73 are moved inwardly they cause reeds 17 to flex with the balls 16 as fulcrums, thereby tipping the table by minute amounts. The adjustment effected by the screws 73 is much finer than that effected by the screw 70 and is moreover along an imaginary radial line passing through the table center to either of the supporting balls so that a tipping movement in any desired direction may be effected. In other words, the leveling points on the table, i.e., the points immediately above the balls 16, and 67 are spaced 120° apart and the screws 70 and 73 tilt the table about lines joining two of these points.

With the construction described above in mind, the mode of utilizing the adjusting means in setting up a piece for gaging is believed obvious but nevertheless will be briefly described.

Let it be assumed that it is desired to determine roundness of a cylindrical part to a tolerance of ±0.000001". The part will be placed on the table and centered as closely as possible by eye, concentric rings etched on the table top (not shown in the drawings) aiding the placement. An electronic gaging probe 12 mounted on a stand such as that shown in my copending application Ser. No. 693,-864 is placed on a horizontal table and the gaging point brought into contact with the cylindrical surface 13; the table is then slowly rotated while the indications of a meter receiving amplified signals corresponding to the movement of the probe are observed. The meter readings indicate necessary corrections to place the workpiece axis concentric to the table axis and adjustments of the knobs 46 are effected until the meter indicates as little deviation during a complete revolution as is possible.

In order to assure that the axis is parallel to the workpiece, the probe may be brought to bear against the workpiece near its base or near its upper end or both, and the table rotated, the piece being adjusted so that the probe trace does not indicate an ellipse. Readjustment of the centering and tilting is then effected. It should be mentioned at this point that the deviations are preferably recorded on a polar chart rotated synchronously with the table and that any off-axis condition of a perfectly round workpiece will produce a cardioid rather than a true circle, especially if the amplification is in a high range, for example, 2500 to 1 or higher. To avoid error, it is therefore required that the workpiece be accurately centered with the bearing axis.

In the same manner, concentricity of two surfaces of the piece may be determined by moving the probe vertically or radially after determination of roundness and recording the contour of the second surface on the same chart. In some instances the use of two gaging probes is desirable since this permits simultaneous recordings and lessens the likelihood of error.

When parallelism of surfaces is to be measured, the piece is first preferably made concentric to the spindle axis as described above and the gaging probe then placed in contact with a surface, the parallelism of which to another surface is to be determined. By utilizing two gaging probes and moving them radially inward or outward in steps and rotating the table at each adjustment, the parallelism of two surfaces, such as the walls of a groove, may be determined.

As is obvious from the above, the present invention provides a rotary work-supporting table for precision gaging which provides for precise adjustment of the workpiece as respects concentricity and parallelism of the axis thereof to the axis of the table spindle.

While a preferred embodiment of the invention has been described, it will be obvious that many variations are possible. I wish therefore to be limited not by the foregoing description, but on the contrary, solely by the claims granted to me.

What is claimed is:

1. In a device for mounting workpieces for gaging the properties of surfaces thereof, of the type having a rotatable spindle with a horizontal upper surface parallel to an adjacent surface plate on which a gaging probe is mounted, and a table mounted on the upper spindle surface, said table being horizontally adjustable to center the workpiece on the spindle axis and tiltable to align the workpiece axis with the spindle axis, the improvement comprising, in combination, means mounting the table on the spindle upper surface for rotation therewith and for limited movement along X and Y axes in the horizontal plane, means for moving said table along said axes comprising, in combination, an intermediate disc, a pair of reeds, means for mounting said pair of reeds on said disc radially outward of the spindle center, each extending across one of said X and Y axes, a rigid arm fixed to each reed, a table adjusting member attached to said table, said member lying radially inward of said reeds and said arms, a plunger bearing against each said reed arm adjacent the flexure point of the associated reed, each said plunger lying on one of said X and Y axes, spring means for moving said member in a direction bisecting the angle between said axes, means for individually adjusting the position of the ends of said arms remote from said reeds to thereby precisely adjust the table relative to the spindle along said X and Y axes to align the centers thereof, and means for tilting said intermediate disc to tilt said table top relative to said spindle upper surface.

2. In a device as claimed in claim 1, said means for mounting said pair of reeds being an arcuate segment and said arms being arcuate in form and said member being a disc.

3. In a device as claimed in claim 1, said means for adjusting the position of said arms comprising a roller mounted in the remote end of each said arm, a screw extending radially inward in a threaded bore in said intermediate disc and a roller fixed to said screw and bearing against the corresponding arm mounted roller, said screws having a fine pitched thread and said distance from the reed flexure point to the corresponding plunger being a small portion of the distance from said flexure point to said roller whereby the adjustment of said table center relative to the spindle center may be made with great precision.

4. In a device as claimed in claim 1, said table mounting means comprising a plurality of balls located at spaced points about a circle concentric with the disc center between the upper surface of said intermediate disc and the undersurface of said table.

5. In a device as claimed in claim 1, said table mounting means comprising a ring affixed to the upper surface of said intermediate disc, a plurality of pockets in said ring, and a ball in each said pocket, said table resting on said balls and wherein said table adjusting member depends therefrom and lies within said ring.

6. In a device for mounting workpieces for gaging the properties of surfaces thereof, of the type having a rotatable spindle with a horizontal upper surface parallel to an adjacent surface plate on which a gaging probe is mounted, and a table mounted on the upper spindle surface, said table being horizontally adjustable to center the workpiece on the spindle axis and tiltable to align the workpiece axis with the spindle axis, the improvement comprising, in combination, an intermediate disc, means mounted on said disc for adjusting the position of said table along said horizontal X and Y axes, a plurality of balls at spaced points radially outward from the center of said intermediate disc and between the undersurface thereof and the upper horizontal surface of the spindle, a reed cooperating with each said ball fixed to the undersurface of a groove in said intermediate disc, each said ball acting as a fulcrum for its said corresponding reed, and pointed screws threaded into radial bores in said intermediate disc, each making contact with the upper surface of the end of a corresponding one of said reeds, each said screw serving to tilt said table about a line between centers of the noncorresponding balls.

7. In a device as claimed in claim 6, there being three reeds and three grooves, a central one lying on a diameter of said disc and outer ones extending parallel to said central groove and wherein said reeds are fixed to said intermediate disc at the same side of the center thereof, said ball cooperating with said central reed being on the opposite side of the disc center from the point at which the corresponding reed is fixed and said balls for said outer reeds lying on the same side of the disc center as said fixing points of said reeds.

8. A device as claimed in claim 7 wherein said central reed and corresponding ball constitute coarse adjustment means and said outer reeds and balls constitute fine adjustment means.

References Cited

UNITED STATES PATENTS

| | | | |
|---|---|---|---|
| 3,164,909 | 1/1965 | Rosenberg | 33—174 |
| 3,026,746 | 3/1962 | Mueller | 74—822 |
| 2,828,589 | 4/1958 | Hercik | 51—240 |

SAMUEL S. MATTHEWS, Primary Examiner